United States Patent [19]

Pratt, Jr. et al.

[11] 4,382,660
[45] May 10, 1983

[54] OPTICAL TRANSISTORS AND LOGIC CIRCUITS EMBODYING THE SAME

[75] Inventors: George W. Pratt, Jr., Wayland; Kantilal Jain, Watertown, both of Mass.

[73] Assignee: Massachusetts Institute of Technology, Cambridge, Mass.

[21] Appl. No.: 689,418

[22] Filed: Jun. 16, 1976

[51] Int. Cl.³ .................................................. G02F 1/01
[52] U.S. Cl. ............................... 350/353; 350/96.14; 350/354; 372/10; 372/18
[58] Field of Search ....................... 350/96.14, 354; 331/94.5 M, 94.5 Q, 94.5 H; 307/425

[56] References Cited

U.S. PATENT DOCUMENTS

| | | | |
|---|---|---|---|
| 3,257,626 | 6/1966 | Marinace et al. | 331/94.5 H |
| 3,538,452 | 11/1970 | Burgwald et al. | 331/94.5 M |
| 3,745,476 | 7/1973 | Mack | 350/354 |
| 3,760,201 | 9/1973 | Nishizawa et al. | 331/94.5 H |
| 3,792,287 | 2/1974 | Roland et al. | 307/427 |
| 3,984,785 | 10/1976 | Riseberg et al. | 331/94.5 M |
| 3,995,311 | 11/1976 | Taylor | 350/96.14 |

OTHER PUBLICATIONS

Johnson et al., Completely Optical Coincidence Logic Employing a Dye Laser, Appl. Phys. Lett., vol. 26, No. 8, (Apr. 15, 1975) pp. 444–447.

Primary Examiner—William L. Sikes
Assistant Examiner—Léon Scott, Jr.
Attorney, Agent, or Firm—Arthur A. Smith, Jr.; Thomas J. Engellenner

[57] ABSTRACT

An optical transistor wherein an optical medium receives a pump signal and produces therefrom an internal optical signal, an optical control signal being directed into the optical medium to perturb the optical properties of the medium and to thereby modify the amplitude of the internal optical signal. A plurality of optical transistors are shown in various logic configurations.

16 Claims, 28 Drawing Figures

OPTICAL TRANSISTORS AND LOGIC CIRCUITS EMBODYING THE SAME

The present invention relates to optical transistors and to logic circuits embodying the same.

There accompanies herewith a copy of a journal article entitled "Optical Transistor" (Jain et al.), published in Applied Physics Letters, Vol. 28, No. 12, June 15, 1976, pp. 719-721, which journal article is hereby incorporated herein by reference.

Opto-electronics is a rapidly developing field encompassing a variety of light emitting devices, light detectors, modulators, etc. Optical devices are commonly integrated into electronic circuits in such a way that the flow of electric charge and the flow of photons interact or are coupled to each other. The optical isolator is one such example wherein electrical circuits are coupled by an optical signal. Rapid progress has also been made in fiber optics, integrated optics, and optical communications. A logical conclusion that can be drawn from these developments is that a need has been created for a totally optical counterpart for many electronic devices with photons essentially replacing electrons. A key device in this correspondence between electronic and "photonic" devices is the optical transistor. This is a device in which a first optical signal controls a second optical signal and in which there is optical power gain. A device of this general nature has been reported by Gibbs et al [Phys. Rev. Lett. 36, 1135 (1976)]. However, the principle of operation is entirely distinguishable from the present invention. Once such device is in hand, one could construct an entire hierarchy of optical devices ranging from optical logic gates, optical flip-flops, optical shift registers, optical multivibrators, optical pulse generators, optical switches, and so forth, if the optical transistor device had the requisite characteristics as disclosed herein. In all these devices, the concern is with the flow of photons in optical fibers, waveguides, etc., into and out of the devices whose transfer functions depend in many cases exclusively on optical considerations. An optical device with power gain is, of course, a basic necessity because there is always optical loss just as one encounters resistive loss in electrical circuits. A fully optical communications system, data processor, or computer would require optical amplifiers or repeater stages to overcome these losses.

There is disclosed herein an optical transistor which has power gain and there are further disclosed optical devices and optical circuits which use the optical transistor. The basic physical principle applied is that characteristic device dimensions L are thousands of optical wavelengths ($\lambda$). A very small change in the index of refraction n can lead to change in L/$\lambda$ by unity, which changes the phase of light across the device dimension of $2\pi$. Similarly, a very small change in n can lead to a very large change in coherence length $l_c = \pi/\Delta k$, whee $\Delta k$ is the phase mismatch, as discussed in detail hereinafter. This great sensitivity of optical properties to index of refraction, and to phase matching in particular, will be the source of optical gain and will play a vital role in the transfer and system functions of optical devices and optical circuits.

Accordingly, it is an object of the present invention to provide an optical transistor.

Another object is to provide an optical transistor wherein a nonlinear, medium is employed whose index (or indices) of refraction is modulated by an optical signal.

Another object is to provide an optical transistor wherein a nonlinear optical medium is adapted to receive an electrical signal which establishes an operating point which defines the nature of the response of the transistor to an optical input signal.

Still another object is to combine optical transistors and circuit elements to form optical devices such as logic gates, flip-flops, shift registers, pulse generators and the like.

Still another object is to combine said optical devices into optical circuits.

Still another object is to combine said optical devices and circuit elements into an optical computer.

Still another object is to use optical feedback in the optical circuits to gain the advantages in optical circuitry realized by electrical feedback in electrical circuitry.

Still another object is to provide an optical device capable of receiving a multiplicity of optical signals and of either amplifying them independently or of mixing them to form new optical signals.

Still another object is to use optical media whose indices of refraction can be adjusted by use of the electro-optic effect.

These and still other objects are addressed herein.

The foregoing objects are achieved in part by an optical transistor that comprises an optical medium that emits an optical output signal that is derived from an optical pump signal. What in fact occurs is that the optical pump signal generates an internal optical signal within the medium and the output optical signal is derived from the internal optical signal. The optical medium receives as further input an optical control signal that effects perturbation of optical properties of the optical medium. A preferred way is by varying the index of refraction. The output optical signal is controlled by this perturbation, e.g., a variation of refractive index. Thus direct control of a first optical signal (also called "internal optical signal" herein) is effected by a second optical signal (also termed "optical control signal" herein). In a nonlinear optical medium, a change in refractive index will perturb the phase matching condition between the pump signal and a harmonic generated from the pump signal. Harmonic generation (as indeed other processes such as parametric amplifications) is very sensitive to phase matching. A perturbation of the optical medium by the optical control (or modulating) signal or signal beam acts to control the amplitude or intensity of the output optical signal and can control its frequency as well. Such perturbation can also be realized from an applied electric or magnetic field.

The foregoing objects are further partially realized by combinations of optical transistors in optical circuits. The pump beam can be a single or multiple frequency signal. It may also play the direct role of the first optical signal that is controlled by the second optical signal. In the case of harmonic generation or of parametric amplification, the first optical signal may be generated from or by the pump beam within the optical medium. The second optical signal that controls the first optical signal can be a single or multiple frequency signal; it may be totally independent of the pump beam and/or the first optical signal, or the output signal; it may, on the other hand, depend on one or all of these signals and may be an optical feedback signal. Examples are discussed within this disclosure. The output signal may be a single or multiple frequency signal and it is taken to mean the optical signal or signals controlled by the second optical signal. The second optical signal is sometimes referred to as the signal beam and as the optical control signal.

The invention is hereinafter described with reference to the accompanying drawing in which.

Some preliminary and general comments are contained in this and the next few paragraphs. In the system herein disclosed, the end or objective sought is that of modifying and controlling the power of an output optical signal from an optical medium by an input optical control signal to the medium. Specifically, what is shown is that an optical pump signal can be converted by the medium to an internal optical signal within the medium and that the output optical signal may be identical to the internal optical signal or be related thereto (in this way the output signal is derived from the input pump signal); the present inventors have found that a further input optical signal to the medium can be used to control the amount of power derived by the optical output signal from the optical pump signal, that is, the amount of power ($P_o$) derived by the output signal from the pump signal can be controlled by controlling the power ($P_c$ herein) of the optical control signal. Said another way, the inventors have found that the optical characteristics of the optical medium can be affected by the control signal to effect a change ($\Delta P_o$) in the amount of power derived by the optical output signal from the optical pump signal and, hence, the amplitude of the output signal. The optical medium described in greatest detail herein is a birefringent nonlinear crystal with a large nonlinearity, that receives the two input signals (i.e., a pump signal and a control signal) and produces the output signal as a harmonic of the pump signal; a change is wrought upon the refractive index n of the medium by the control signal and a pump-signal harmonic generated therefrom, which harmonic can be the output signal whose amplitude or intensity is thus controlled by the second signal; also, the frequency of the optical output signal can be similarly controlled. The internal optical signal generally differs from the optical pump signal in at least one of frequency and polarization. In a birefringent optical medium there is more than one index of refraction, i.e., the ordinary and extraordinary index. The optical control signal effects changes in the index ellipsoid which changes affect the polarization of the pump beam and nonlinear optical processes involving the pump beam as it traverses the medium.

Optical waveguides and fibers play a fundamental role in the construction and performance of optical circuits. This general area has been reviewed in the book "Integrated Optics" edited by D. Marcuse, IEEE Press (1973). In the review article by P. K. Tien at pp. 12–33 of the book "Integrated Optics" the advantages of using thin flims for nonlinear optics are discussed. In particular, very large power densities can be obtained at very modest input levels. High optical power densities can be maintained over extended lengths in a guide strongly enhancing nonlinear phenomena. For example, 1 watt of laser power coupled to a $0.46\mu$ thick ZnS film can result in a power density of 22 MW/cm$^2$, well above the levels required to observe significant nonlinear effects. Tien et al [P. K. Tien, R. Ulrich, and R. J. Martin, Appl. Phys. Lett. 17, 447 (1970)] have observed second harmonic generation (SHG) using a $CO_2$ laser pump in GaAs thin film on a single crystal ZnO substrate while D. B. Anderson and J. G. Boyd [Appl. Phys. Lett. 19, 226 (1971)] have observed SHG using a $CO_2$ laser pump in GaAs thin film waveguides having a $3.2\times 160\mu$ cross section at one end tapering to $3.9\times 160\mu$ at the other face over an interaction length of $1000\mu$, obtaining an overall SHG conversion efficiency of 1 percent for 1.0 watts of input $CO_2$ laser power. Dielectric waveguide modal dispersion was used to achieve phase matching.

Nonlinear effects in thin films deposited on a substrate are subject to a special set of considerations. Propagation may take place in a substrate or air mode or within a discrete set of modes the film itself. The condition for waveguide modes depends on the direction of propagation, upon the indices of refraction $n_1$ of the waveguide and $n_O$ of the substrate, and on the width W of the film. An optical control signal, can perturb one or both of the indices of refraction and, hence, propagation in the structure. The phase matching condition for nonlinear effects such as second harmonic generation (SHG) or parametric oscillation can be obtained without requiring a birefringent crystal. The phase matching condition may be achieved by having the pump beam and one or more of the output beams propagate in different waveguide modes, the nonlinear interaction may take place in the substrate, or the film, or both, and the film and substrate can be immersed in a liquid and phase matching achieved by choosing the correct properties of the liquid. The phase matching requirement for SHG has been approached by generating the second harmonic in the form of Cerenkov radiation. These possibilities are discussed by P. K. Tien [J. Appl. Phys. 10, 12, (1971)]. Clearly a wide variety of combinations of materials including linear, nonlinear, birefringent, optical media and including liquids and even gases as reported by A. H. Kung, J. F. Young, and S. E. Harris, [Appl. Phys. Lett. 22, 301 (1973)] can be used to achieve SHG and other nonlinear effects. All of these nonlinear optical effects in any of the possible structures depend sensitively on the index of refraction of at least one of the materials of the structure. Variation of the refractive index by an optical input signal will act to control the optical output signal of the device. SHG has been achieved in a GaP waveguide which comprised a GaP layer on a $CaF_2$ substrate by van der Ziel et al [J. P. Van der Ziel, R. M. Kikulyak, and A. Y. Cho, Appl. Phys. Lett. 27, 71 (1975)]. They showed the possibility of phase matching in a 723 Å thick guide with a TE fundamental and a TM harmonic. Large overlap of the fundamental and second harmonic m=0 modes suggest efficient second harmonic generation.

As later discussed, additional sensitivity of the optical transistor can be achieved by using an avalanche photo diode or p-i-n diode or a photo transistor. The input optical control signal beam acts to create initial hole-electron pairs which, by the process of avalanche multiplication in the diodes and by the current gain mechanism in the photo transistor, leads to the production of many times the number of initial hole-electron pairs. This enhanced generation of hole-electron pairs will in turn amplify the change in refractive index due to free carriers. Consequently, if SHG or another nonlinear process depends on a phase matched condition involving the refractive index in a part of an avalanche photo diode or a part of a phototransistor, when enhanced free carrier generation takes place, the effect of the original input signal will be amplified. In another embodiment the hole-electron pairs created by the optical control signal may lead to a change in internal electric field acting on the optical medium whose index of refraction may be altered by the electro-optic effect.

Figure 1:
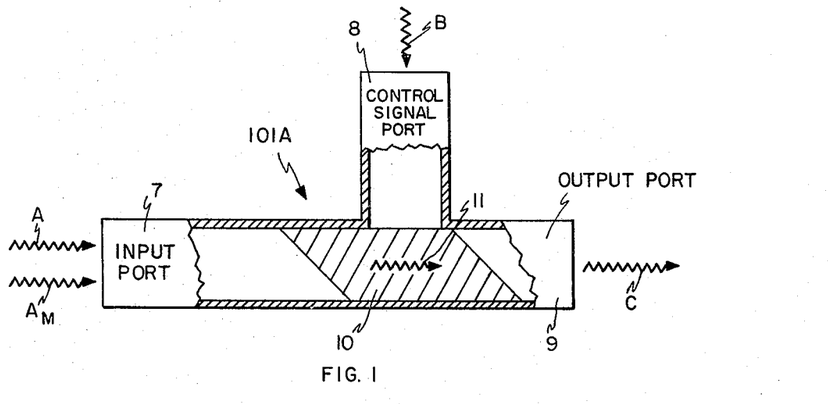
FIG. 1 is a side view, partly cutaway and partly schematic in form, showing an optical transistor.

Turning now to FIG. 1 an optical transistor (optransistor) is shown at 101A comprising an optical medium 10 and three optical ports: an optical collector port 7 to receive as input an optical pump signal A, an optical emitter port 9 to emit an optical output signal C and an optical base port 8 to receive as input an optical control signal B that effects a change in at least one optical property of the optical medium 10, which change serves to provide a basis for control of at least one of frequency, intensity and phase of the optical output signal. The optical medium 10 forms part of an optical waveguide structure and the three optical ports comprise waveguide members, as shown. The optical medium 10 is appropriately oriented relative to the waveguide members to receive the two optical input signals A and B and to emit the optical output signal C.

Figure 3:
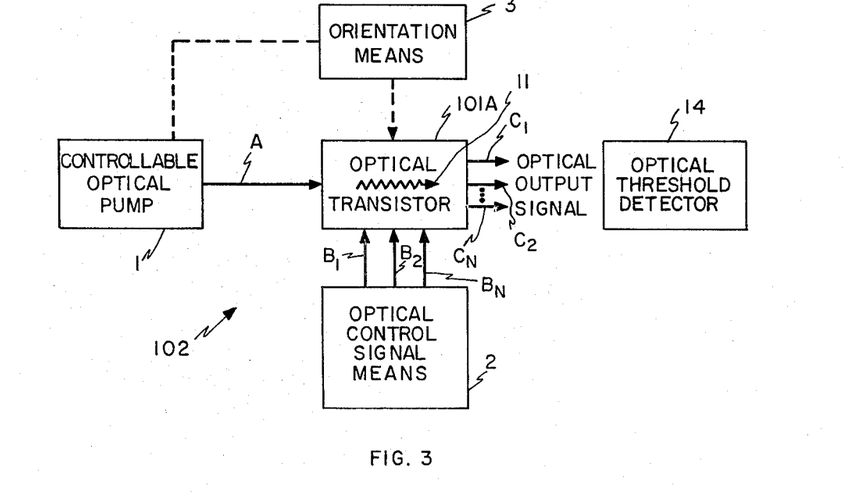
FIG. 3 shows in block diagram form an optical transistor system that includes an optical transistor of the type shown in FIG. 1.

The optical transistor 101A is shown in an optical system 102 in FIG. 3. The system 102 includes a controllable optical pump 1 that provide single or multiple optical pump beams $A-A_M$ and optical control signal means 2 that provides the optical control signal B or signals $B_1$, $B_2-B_N$. The power levels of the pump, control, and output signals are respectively designated $P_p$, $P_c$ (as indicated above for each distinct pump signal the control signal may be a plurality of signals $B_1$, $B_2-B_N$, the respective optical outputs being $C_1$, $C_2-C_N$ and the respective powers thereof being $P_{C-1}$, $P_{C-2}-P_{C-N}$) and $P_o$ (or $P_{o-1}$, $P_{o-2}-P_{o-N}$ for output signals $C_1$, $C_2-C_N$, respectively) herein. It is shown later that the optical output signal C is derived from an internal optical signal 11 in FIGS. 1 and 3 which, in turn, is derived from a pump signal A, that is, pump power $P_p$ is converted within the medium 10 to internal optical signal power $P_i$ and some, all, or most of the latter emits from the medium 10 as the optical output signal C. The optical medium 10 is one whose optical characteristics are such that conversion of optical pump signal power $P_p$ to internal signal power $P_i$ is a function of the intensity of the optical pump signal and/or the orientation of the optical medium relative to the direction of propagation of the optical pump signal—that is, the conversion of pump power $P_p$ to internal signal power $P_i$ can be affected by changing the level of pump power $P_p$ or by changing the orientation of the crystal relative to the pump beam A (by use, say, of orientation means 3 in FIG. 3) or both. In a preferred form of the invention, as shown in FIG. 1, the orientation of the medium 10 is established relative to the waveguide members and it is the level of $P_p$ that is adjusted. (Alternative methods can be used to set or program the operating point, such as, for example, applying an electric or magnetic bias, as discussed elsewhere in this specification.) The form of medium 10 discussed in greatest detail herein is a nonlinear crystal 10 that receives a pump signal A (the power level of the pump beam is also termed $p^\omega$ herein) and conversion is by the process of harmonic generation wherein the internal optical signal 11 is the second harmonic of the pump signal A the power level of the second harmonic internal signal is also termed $P^{2\omega}$ herein). A typical nonlinear curve representative of power conversion from pump power $P_p$ to internal signal power $P_i$ (or output signal power $P_o$) is shown at 20 in FIG. 4 wherein, in the expression, $P^{2\omega}$ represents the internal signal power $P_i$ or the output power $P_o$, $P_{max}^{2\omega}$ represents the maximum possible internal signal power $P_i$, L is the optical length of the crystal 10, $\Delta n$ is the mismatch in refractive index n from phase matching of the crystal, $\lambda$ is the wavelength of the pump energy. Operation of the various optical systems herein disclosed is based upon the nonlinear operating curve 20 in FIG. 4, as briefly explained in the next paragraph and in much greater detail hereinafter.

Figure 4:
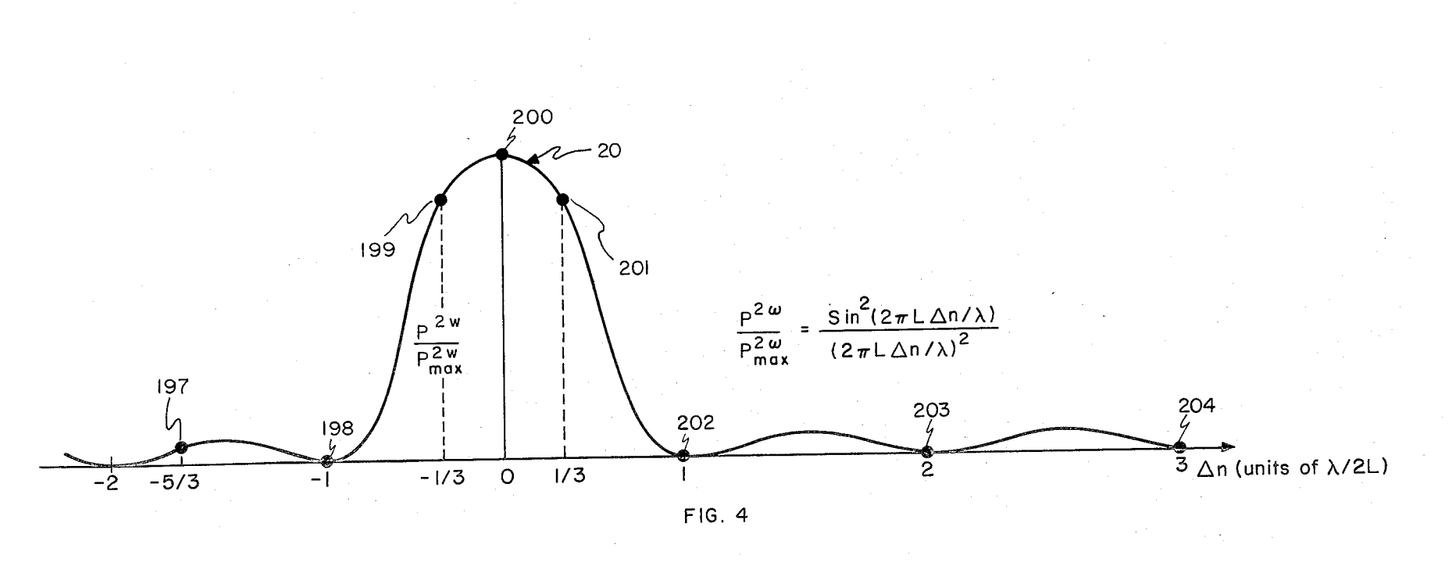
FIG. 4 shows the dependence of power output from the emitter port of the optical transistor of FIG. 1 on the phase matching condition expressed in terms of the deviation of the refractive indices from the phase matching conditions and further shows the location of diverse operating points.

Operation of the systems herein disclosed, of course, can be at any one of an infinite number of points on the nonlinear curve 20, but, for present purposes, a finite number of such operating points are chosen and those points are marked 197–204. Taking any one of such points, say the point marked 202, operation at such point can be attained by a choice of power $P_p$, $P_c$ or by use of an electric or magnetic bias at a particular crystal orientation and thereafter the optical transistor (e.g., the optical transistor 101A) can be made to operate about the initial point thus established—here the point 202. More specifically, conversion from pump power $P_p$ to internal signal power $P_i$ is a function of the index of refraction n at any particular orientation of the crystal 10 relative to the pump beam A and incremental changes in the mismatch $\Delta n$ of the index of refraction from phase matching as detailed in Jain et al can be wrought by and optical control signal B.

In particular, for operation about the operating point 201, an incremental change $\Delta P_c$ in the power level $P_c$ effects incremental changes $\Delta P_o$ in the power level $P_o$ of the optical output signal $P_o$ (or similar changes $\Delta P_i$ in the internal signal power $P_i$) such that $$\left| \frac{\Delta P_o}{\Delta P_c} \right| > 1$$

The foregoing expression is, of course, the basic form of expression for signal amplification. The operation of the system could have been chosen at operating point 199 and workers in this art will recognize that such operation would also result in amplification.

Figure 6:
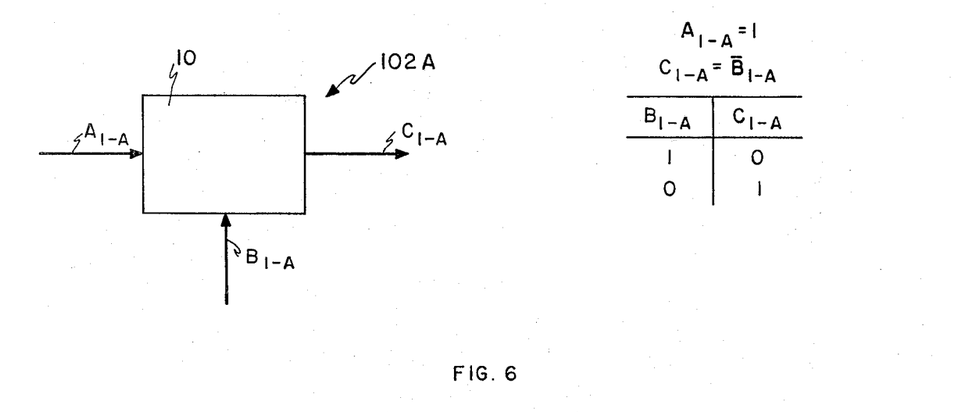
FIG. 6 shows diagrammatically an optical INVERTER gate and corresponding truth table.
Figure 7:
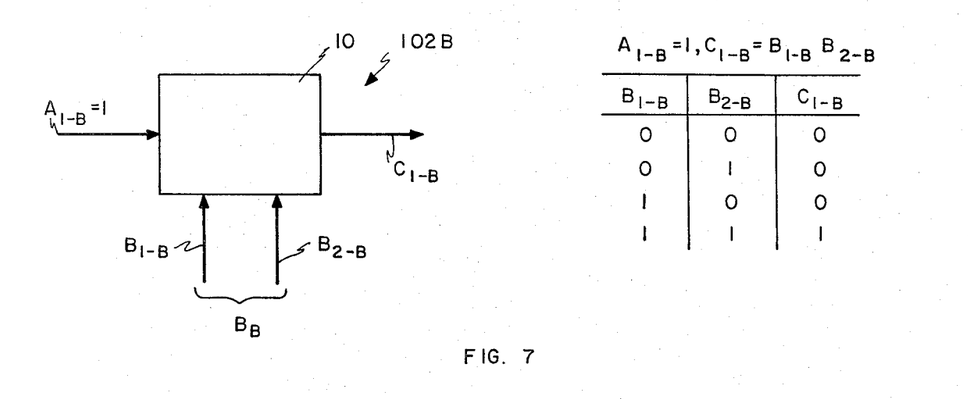
FIG. 7 shows diagrammatically an optical AND gate and corresponding truth table.
Figure 8:
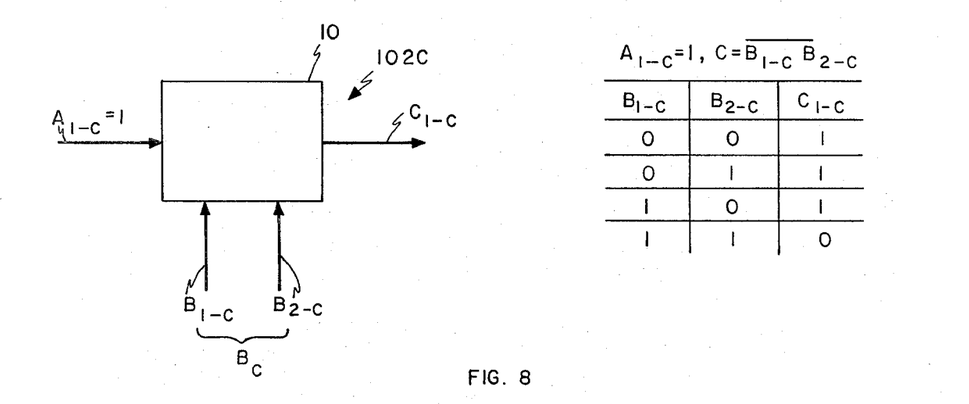
FIG. 8 shows diagrammatically an optical NAND gate and corresponding truth table.
Figure 9:
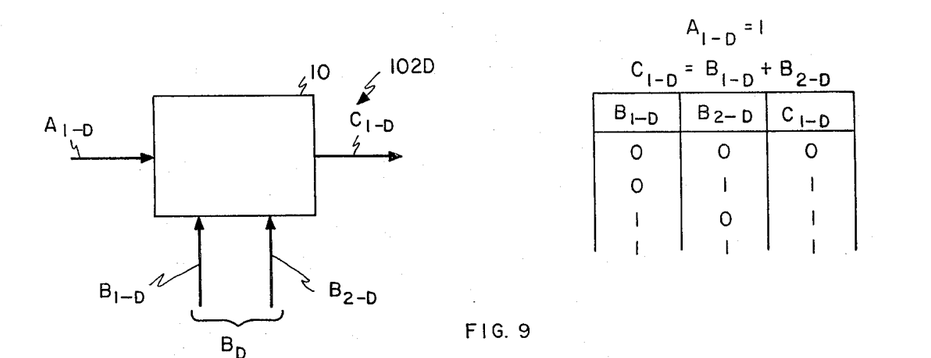
FIG. 9 shows diagrammatically an optical OR gate and corresponding truth table.
Figure 10:
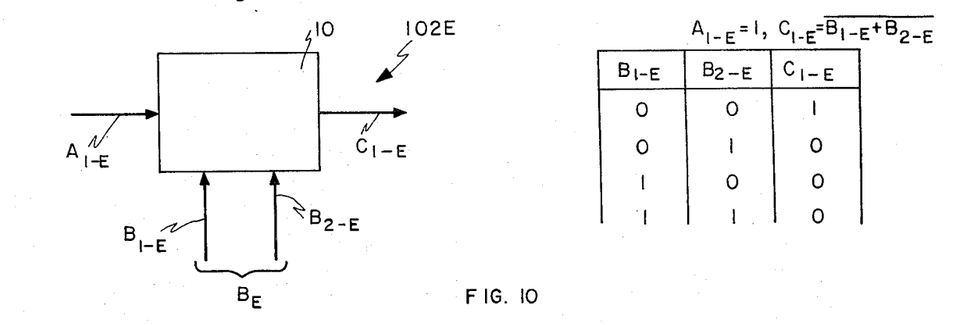
FIG. 10 shows diagrammatically an optical NOR gate and corresponding truth table.

Later in this specification various interconnected combinations of optical transistor systems are shown and in all cases the nonlinear curve 20 must be kept in mind. For example, an INVERTER gate or optical switch function can be accomplished by operating a device, like the device 101A, at two operating points, say operating points 202 and 200 as alternate conditions of system operation by the presence and absence, respectively, of the input control signal B; Such system operations, it is recognized will result in an INVERTER gate function. Other logic functions such as AND functions, OR functions, and so forth, can be achieved by appropriate operations of a system, like the system 102 of FIG. 3. In the explanation hereinafter, the various logic devices or systems discussed are given the label 102 with a letter added. Thus the system shown at 102A in FIG. 6 is an INVERTER gate, that shown at 102B in FIG. 7 is an AND gate, that shown at 102C in FIG. 8 is a NAND gate, that shown at 102D in FIG. 9 is an OR gate, that shown at 102E in FIG. 10 is a NOR gate.

Figure 11:
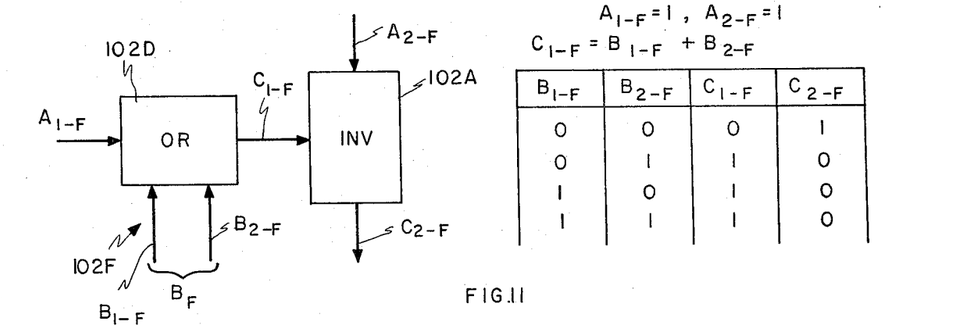
FIG. 11 shows diagrammatically an alternative construction of an optical NOR gate and corresponding truth table.

The systems in FIG. 11 and later figures, except FIGS. 20 and 21, consist of a plurality of the devices of the earlier figures; thus the system marked 102 F in FIG. 11 is also a NOR gate, but in this instance, it consists of an OR gate 102D and an INVERTER 102A, interconnected. An attempt is made to apply consistent labels to the block elements herein to simplify the explanation and in the understanding of the concepts herein.

The optical transistor 101A is the optical analog of a bipolar transistor, the signals A, B and C being the optical analog of the collector, base and emitter signals of a bipolar transistor. As previously discussed, the optical medium 10 receives the pump signal A and produces therefrom the first optical signal 11 within the medium; the medium also receives the second signal B that acts to effect a perturbation of the optical properties of the medium 10 and hence the establishment of the first optical signal 11 within the medium 10, the first optical signal 11 being controlled by virtue of said perturbation and issuing from the medium 10 as at least part of the output signal C. The optical medium 10 is transparent or substantially transparent to the radiation frequencies of the optical pump signal A and the optical output signal C but is not transparent (i.e., it is substantially opaque) to the optical control signal B.

As a specific example, there is discussed in this paragraph the case of harmonic generation. In this case, the optical medium 10 is preferably a nonlinear crystalline material such as Te, $LiNbO_3$, etc. The first or internal optical signal 11 is derived from the pump beam and is generated within the medium as one of its harmonics. The control signal B is one which perturbs the medium 10 by affecting the phase matching condition between the pump signal A and the internal optical signal 11. The output signal C is the harmonic or the harmonics emitted from the medium 10 and controlled by the input or perturbing signal beam B. The case of second harmonic generation (SHG) is treated in detail below. Beforehand, it is pointed out that in addition to harmonic generation, the optical process controlled by the optical control signal B can be that of parametric amplification, mixing, Raman scattering or optical rotation, among others. There now follows first a discussion of an optical transistor wherein the optical process is harmonic generation and that is followed by a discussion of parametric amplification.

The system 102A is discussed in great detail hereinafter alone and in combination with other like systems that form logic networks. In the Jain et al journal article, the system discussed most is one in which the crystal is birefringent and is tellurium, the pump signal A is a beam of a $CO_2$ laser (i.e., 10.6 microns), the nonlinear crystal 10 produces by second harmonic generation the internal optical signal 11 which, in this case, is at 5.3 microns, the perturbating signal B is the beam of a CO laser at 5.3 microns. It is shown in what follows that a weak incoming optical signal B controls a strong outgoing signal C. The basic principle utilized in the device 101A is the strong dependence of second harmonic generation in the phase matching condition. A weak incoming signal B can perturb the indices of refraction in a birefringent material so that the second harmonic power derived from the pump beam A is significantly affected; in this way, large incremental power gain is possible.

The second harmonic signal is given, for example, by Yariv, "Quantum Electronics" John Wiley and Co., 1967, at page 355, as $$P^{2\omega} = P^{2\omega}_{max} \frac{\sin^2(L\Delta \cdot k/2)}{(L\Delta \cdot k/2)^2}.$$

where L is the device length and $\Delta K = k^{2\omega} - 2k^\omega$, $k^\omega$ being the propagation vector at frequency $\omega$. Using the relation $k = \omega n/c$ where n is the index of refraction at frequency $\omega$, the above equation can be written in terms of $\Delta n$ as it is in FIG. 4. As above noted, by proper adjustment of orientation of the crystal 10 in FIG. 3 with respect to the pump signal A or by adjustment of the pump signal intensity or electric or magnetic bias an "operating point" may be established, i.e., a point about which the output signal B is varied by the input signal C. FIG. 4 shows eight possible operating points 197, 198, 199, 200, 201, 202, 203, and 204. The slope of the curve 20 shows the ratio $p^{2\omega}/P_{max}^{2\omega}$ as a function of $\Delta n$ and said ratio is a maximum near the operating points 199 and 201, hence, variations about the points 199 and 201 due to the input signal B produce the maximum power gain. It is shown in the Jain et al. paper that about the operating point 201 the variation $P^{2\omega}$ with refractive index is $$\frac{\partial P^{2\omega}}{\partial \Delta n} \simeq \frac{\pi \eta P^{\omega} L}{\lambda}$$

The variation in refractive index $\Delta n$ is caused by the presence of signal beam B. One means of producing variation is photoproduced carriers whose presence alters the plasma frequency $\omega_p$, and hence, the dielectric constant $\epsilon^{\omega}$ of the medium 10. One is finally led, as discussed in the Jain et al. journal article, to the final expression for the power gain about the point 201 of $$\frac{\partial P^{2\omega}}{\partial P_s} = \frac{r_o \eta P^{\omega} L \lambda \alpha \tau}{2 A_s \hbar \omega_s} \left( \frac{m}{m^*} \right) \left( \frac{1}{n_\alpha^\omega} - \frac{1}{4 n_\beta^{2\omega}} \right),$$

where $r_o$ is the classical radius of the electron, $\eta$ the second harmonic efficiency, $\alpha$ the absorption constant at frequency $\omega$ of the optical medium, $\tau$ the photo-produced carrier lifetime, $A_s$ the area of the signal beam whose frequency is $\omega_s$ and the subscripts $\alpha$ and $\beta$ represent the polarization directions of the first and second harmonic signals. An incremental power gain of approximately 500 is expected for $T_e$. The input signal beam B can act directly to produce carriers in the medium 10 of FIG. 1 or can act together with the pump beam A to produce carriers by virtue of two photon absorption. Thus, by adjusting the dc level of the pump beam A and/or the signal beam B, it is possible to alter the carrier concentration and, hence, the operating point. A change in operating point can also be effected by varying the crystal orientation of the optical medium 10 relative to a pump beam A. Setting the operating point at different values is a programmable property of the optransistor herein disclosed.

The optical Parametric Oscillator has been fully discussed. See, for example, Yariv and Louisell, IEEE, J. Quant Elec. QE-2, No. 9, pg. 418 (1966). Under the proper conditions a pump beam at frequency $\omega$ is converted into the internally generated signals comprising a signal beam at $\omega_1$ and an idler beam at $\omega_2$ where $\omega = \omega_1 + \omega_2$. Efficient energy extraction from the pump requires phase matching, i.e., $\Delta k = k - (k_1 + k_2)$ vanish where $k$, $k_1$ and $k_2$ are propagation vectors for the pump, signal and idler beams, respectively. Phase matching and energy conservation require $k = k_1 + k_2$ and $\omega = \omega_1 + \omega_2$. Usually for a particular orientation of the nonlinear medium in which parametric amplification or oscillation takes place, only one pair of signals will satisfy both conditions $k = k_1 + k_2$ and $\omega = \omega_1 + \omega_2$. The pump beam must exceed a threshold power level in order for steady state oscillation at $\omega_1$ and $\omega_2$ to be possible. This threshold level depends on phase matching and, in fact, is inversely proportional to the quantity $F(\Delta kL)$ which is defined as $$F(\Delta kL) = \frac{\sin^2\left(\frac{\Delta kL}{2}\right)}{\left(\frac{\Delta kL}{2}\right)^2}$$

Index matching occurs when $$n^{\omega}(\theta) = \tfrac{1}{2}[n^{\omega 1}(\theta) + n^{\omega 2}(\theta)]$$

where $\theta$ is the angle between the direction of propagation and the appropriate optic axis of the nonlinear optical crystal. FIG. 3 shows the general situation when the output signal contains several frequencies. A pump beam A at frequency $\omega$ enters the nonlinear optical medium 10. A control signal beam B denoted by $P^s$ also enters the medium 10. $P^s$ must have the property that it modifies the index of refraction n at at least one of the frequencies $\omega$, $\omega_1$, or $\omega_2$. In the case of parametric oscillation, $P^s$ can change the output frequencies $\omega_1$ and $\omega_2$ of the output beam C which are derived from the pump beam A in FIG. 3, i.e., $P^s$ acts to tune the parametric oscillator by varying the phase matching condition. Variations in the power of the signal beam B result in frequency modulation of the parametric oscillator. In the process of frequency conversion, as opposed to parametric oscillation, the pump beam generates two waves, one at $\omega_2$ and one at $\omega_1$ where $\omega_2 - \omega_1 = \omega$ if the index matching condition $k + k_1 = k_2$ is satisfied. Again, since $k = (\omega n/c)$, and because the index n depends on the presence or absence of the signal beam B, the input signal beam B of FIG. 3 will affect the phase matching conditions. Keeping the orientation of the pump beam A fixed with respect to the axes of the nonlinear medium 10, an amplitude modulation of the signal beam B results in a frequency modulation of the output beams C. Parametric oscillation, frequency conversion, and SHG are all special cases of the propagation of electromagnetic waves in a nonlinear medium. The particular process that takes place is determined by the phase matching condition. Because of the great sensitivity of $F(\Delta kL)$ to the index of refraction, incremental optical power gain is possible in all of these processes. The frequency modulation of the parametric oscillator or of the frequency converter due to amplitude modulation of the signal beam B of FIG. 3 will have an index of modulation $M_f \gg 1$. The index of modulation in parametric oscillation and frequency conversion is the generalization of the incremental power gain in SHG.

Figure 5:
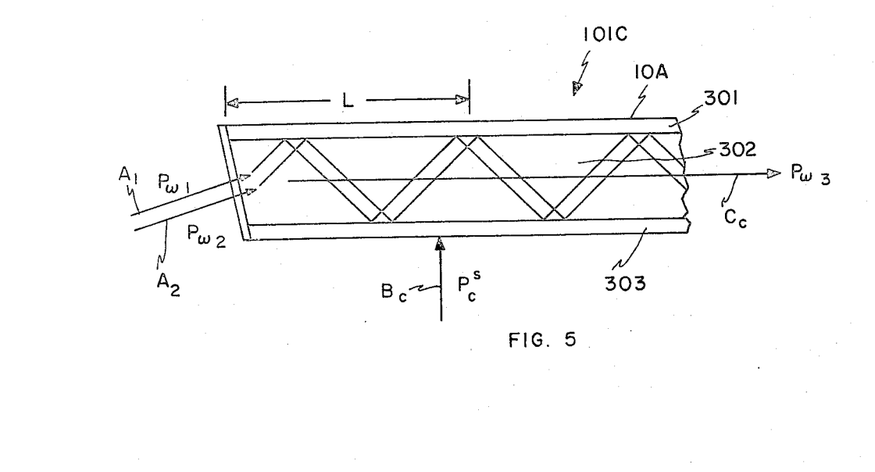
FIG. 5 is a diagrammatic side view showing an optical transistor structure in which the optical medium thereof is oriented with respect to the collector port so that multiple reflections of the optical signal input from the collector port occur within said medium.

Multiple reflections in the structure designated 101C in FIG. 5 can be said to achieve optical transistor action in harmonic generation, optical mixing, and parametric conversion processes. As discussed by Bloombergen and Pirshan [Light Waves at the Boundary of Nonlinear Media, Phys. Rev. 128, 606 (A62)] harmonic waves emanate from the boundary of nonlinear media. The optical transistor 101C comprises a composite optical medium 10A that consists of a linear medium 302 bounded by media 301 and 303 at least one of which is nonlinear; it can be shown that such a composite medium may be used for SHG and other nonlinear processes. Repeated total reflections take place and at each reflection the nonlinear interaction occurs. The authors Bloombergen and Pirschan observe that the problem of phase matching is now transferred to the linear medium 302 and that the boundary layers 301 and 303 could comprise cladding of a guide with nonlinear material. A single pump beam in Bloombergen and Pershan is used at frequency $\omega$ (the structure of FIG. 5 may be employed with such a single pump beam but it is, in fact, shown with two input pump beams $A_1$ and $A_2$ at respective powers $P\omega_1$ and $P\omega_2$ as discussed later in the next paragraph in connection with the Lee at al. work). The optical output signal is at frequency $2\omega$, and the internally generated second harmonic signal is also at $2\omega$. The incoming optical control signal B affects the phase matching condition by causing a change either directly or indirectly in the index of refraction. A direct mechanism is, for example, the creation of carriers that affect the plasma frequency and, hence, the refractive index. An indirect mechanism is the creation of local electric charge that modifies the electric field acting upon the structure 101C which leads to an index variation due to the electro-optic effect discussed in greater detail below. Now shown in FIG. 5 is means for applying an external electric field to a section of structure 101C whose influence on the refractive index would be modified by the input control signal B.

A structure such as the structure 101C in FIG. 5 can also be used for parametric conversion as taught in a journal article by Lee et al. [Optics Comm. 11, 339 (1974)]; see also U.S. Pat. No. 3,983,406, Lax et al, wherein the inventors are the same persons that authored the Lee et al. journal article just mentioned. In the work of Lee et al the pump beam consists of two frequencies $\omega_1$ and $\omega_2$ (labeled $A_1$ and $A_2$ in FIG. 5) and the output beam $C_c$ is at the difference frequency, i.e., $\omega_3 = \omega_1 - \omega_2$. Turning again to said FIG. 5, the medium 302 may be GaAs (as it is in Lee et al.) and the mediums 301 and 303 may be metallic coatings that serve as reflecting surfaces. In this particular example of Lee et al. medium 302 was GaAs and media 301 and 303 were metallic coatings providing reflecting surfaces. A phase matching condition for the optical mixing of the inputs at $\omega_1$ and $\omega_2$ depends on the index at the three frequencies $\omega_1$, $\omega_2$ and $\omega_3$. An input control signal $B_c$ can perturb this phase matching condition and modify thereby the output signal $C_c$.

The unit 102A in FIG. 6, as above stated, is an INVERTER gate that again comprises an optical medium again labeled 10. The optical medium is aligned for phase matching, i.e., $\Delta n = 0$ with an optical control signal $B_{1-A}$ absent. This would correspond to the operating point 200 in FIG. 4. In the presence of the control signal $B_{1-A}$ let the operating point shift to the point 202 so that the second harmonic $P^{2\omega}$ (i.e., $P_i$ herein) is reduced to a low level which will be interpreted as being absent. At some place in the system, a threshold device is required so that an optical signal can be processed as being present or Hi, i.e., assigned a "1" or being absent or Lo and assigned a value "0" so that digital processing may take place. The truth table for the INVERTER is also shown in FIG. 6. The operation of the INVERTER gate 102A can be summarized thus: a first or initial operating point (i.e., the operating point 200 in the example discussed in this paragraph) is established for the device by electric or magnetic bias or by appropriate level of an optical pump signal $A_{1-A}$ at a particular orientation of the medium 10 in FIG. 6; thereafter the operating point is shifted by changes in the power level of the optical control signal $B_{1-A}$, as previously discussed herein, from the first operating point (i.e., the point 200) to a second operating point (i.e., the point 202 in this example), the optical control means that supplies the control signal $B_{1-A}$ being adapted to provide optical control signal power at two levels, here Lo or zero power and Hi power, respectively, to effect changes from a said first operating point to a said second operating point and vice versa. Conversion of optical pump power $P_p$ in the device 102A to internal optical signal power $P_i$ occurs at a Hi level the first operating point (i.e., the point 200 here) in the absence of control signal power $P_c$ and said conversion occurs at a Lo level at said second operating point (i.e., the point 202 here) in the presence of control signal power; hence the system 102A emits an output signal $C_{1-A}$ which thereby performs the function of an optical INVERTER with respect to the optical control signal $B_{1-A}$.

An AND gate can be constructed which ANDs the pump signal $A_{1-A}$ of FIG. 6 and the optical control signal $B_{1-A}$ to shift the operating point such that the phase matching is achieved only in the presence of the signal $B_{1-A}$ i.e., without the signal $B_{1-A}$ the operating point is, say, at the point 202 or 198 in FIG. 4 and with the signal $B_{1-A}$ present it shifts to the point 200. The output signal is then the AND signal of the signals $A_{1-A}$ and $B_{1-A}$.

A means of creating an AND gate between two separate optical control signals $B_{1-B}$ and $B_{2-B}$ is shown at 102B in FIG. 7, each separate optical control signal being assigned to its own channel, the total optical control signal $B_B$ being the sum of the separate channel inputs. The operating point with $B_{1-B} = B_{2-B} = 0$ in FIG. 7 is the point 203 of FIG. 4. The optical medium is so selected and aligned such that either signal $B_{1-B}$ or $B_{2-B}$ alone shifts operation to the operating point 202 while both signals shift it to the point 200. The changes in $\Delta n$ are very small in moving from the operating point 204 to 203 or to 202. Hence, the dependence of $\Delta n$ on the intensity $I_c$ or power $P_c$ of the control signal beam or beams can be linearized. Therefore, if a given intensity $I_s$ is sufficient to move the mismatch $\Delta n$ from the operating point 204 to the neighborhood of the operating point 203 of FIG. 4 then $2I_s$ will move the operating point from the point 204 to 202 in FIG. 4. Therefore, the effects of multiple optical control signal channel inputs are additive to within a useful approximation. The AND gate 102B in FIG. 7 functions thusly: conversion of optical pump signal power $P_p$ in the medium 10 in FIG. 7 occurs at a Lo level at a first operating point (i.e., the point 203 in the example in this paragraph); it remains at a Lo level at a second operating point (i.e., the point 202 here) in the presence of a first optical control signal (either the signal $B_{1-B}$ or the signal $B_{2-B}$); and conversion occurs at a Hi level at a third operating point (i.e., the point 200 here) by the simultaneous presence in the optical medium of the first optical control signal, say the signal $B_{1-B}$, and a second optical signal, the signal $B_{2-B}$; the system 102B emits an optical output signal $C_{1-B}$ that performs the function of an optical AND gate with respect to the optical control signals $B_{1-B}$ and $B_{2-B}$.

The system shown at 102C in FIG. 8 is a NAND gate if the initial operating point is at 199 of FIG. 4. At this point there is an optical output signal $C_{1-C}$. The presence of either optical control input signal $B_{1-C}$ or separate optical control input signal $B_{2-C}$ in FIG. 8 shifts the operating point to 201 in FIG. 4, maintaining the output signal $C_{1-C}$. The presence of both the control inputs $B_{1-C}$ and $B_{2-C}$ at the same time, i.e., the parallel input of two Hi signals, shifts the gate from the operating point 199 of FIG. 4 to the operating point 202 which destroys the output signal $C_{1-C}$ (i.e., the output signal $C_{1-C}$ is rendered Lo). The truth table of FIG. 8 summarizes the situation.

It is believed appropriate at this juncture to interpose a paragraph of a general nature with the hope that this somewhat long specification can be shortened without sacrificing any of the necessary details. It should by now be quite clear that what the present inventors have found is that an optical control signal can be used to modify a parameter or characteristic of an optical medium to effect changes in conversion from an input optical pump signal to an optical output signal; here the optical medium discussed in greatest detail is nonlinear and to function properly it should have sufficient nonlinearity to provide discrete changes in the operating points therein with levels of control signal that can be provided in practical apparatus, about some initial operating point. The optical control signal may be amplified as it is in the case of the optical amplifier function above discussed, or it may be a logical "1" or "0", i.e., Hi or Lo, respectively, in the case of the optical INVERTER gate 102A, the optical AND gate 102B and the optical NAND gate 102C, as well as the further optical logic gates or optical logic elements now to be discussed in connection with FIGS. 9, 10, 11, 12, 13, 14, 15, 16, 17, 18, 19A, 19B, 20, 21, 22 and 23.

To create the OR gate 102D in FIG. 9, the initial operating point, i.e., when input $A_{1-D}=1$ and $B_{1-D}=B_{2-D}=0$, is at the point 198 of FIG. 4. Either $B_{1-D}=1$ and $B_{2-D}=1$ or $B_{1-D}=0$ and $B_{2-D}=1$ shifts operation to the operating point 199 of FIG. 4. The presence of both $B_{1-D}=1$ and $B_{2-D}=1$ shifts the operating point to 201. The threshold device to be discussed later in greater detail would interpret the level of the output beam labeled $C_{1-D}$ of FIG. 9 corresponding to operating point 198 of FIG. 4 as being in the Lo regime and the signal $C_{1-D}$ corresponding to either operating point 199 or 201 would be interpreted as being in the Hi regime.

To provide the NOR gate 102E in FIG. 10, the operating point is established at 200 with both optical control inputs $B_{1-E}$ and $B_{2-E}=0$. The presence of either $B_{1-E}$ or $B_{2-E}=1$, but not both =1, shifts the operating point to 202 or thereabout while the presence of both $B_{1-E}=1$ and $B_{2-E}=1$ shifts the operating point to 203. A NOR gate can also be made by cascading an OR gate 102D and an INVERTER 102A as shown at 102F in FIG. 11. A NAND gate can be attained by replacing the OR gate 102D in FIG. 11 by an AND gate and cascading this AND gate with the INVERTER 102A of FIG. 11.

Figure 12:
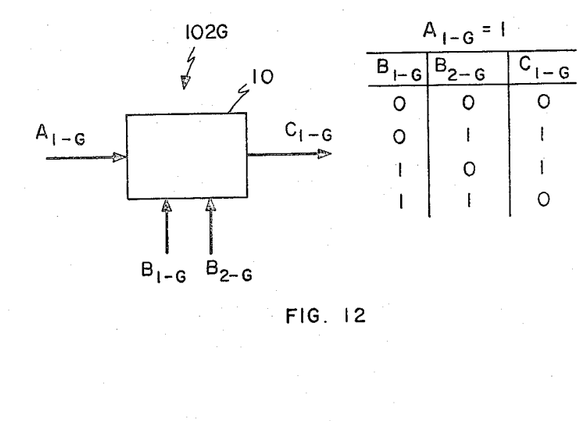
FIG. 12 shows diagrammatically an optical EXCLUSIVE OR gate and corresponding truth table.

An EXCLUSIVE OR gate as shown at 102G in FIG. 12 can be constructed exactly as the AND gate in FIG. 7 except that the operating point for the device 102G with both inputs $B_{1-G}$ and $B_{2-G}=0$ is at 198 on the curve of of FIG. 4. The presence of the signal $B_{1-G}$ or the signal $B_{2-G}$ but not both shifts the operating point to 200 while both $B_{1-G}$ and $B_{2-G}$ present (i.e., the signals $B_{1-G}$ and $B_{2-G}$ are both Hi) shifts the operating point to the point 202 of FIG. 4. The truth table for such EXCLUSIVE OR gate is shown in FIG. 12. In Boolean notation the EXCLUSIVE OR gate 102G can be represented by the coupled combination of an OR gate, two AND gates and an INVERTER.

Figure 13:
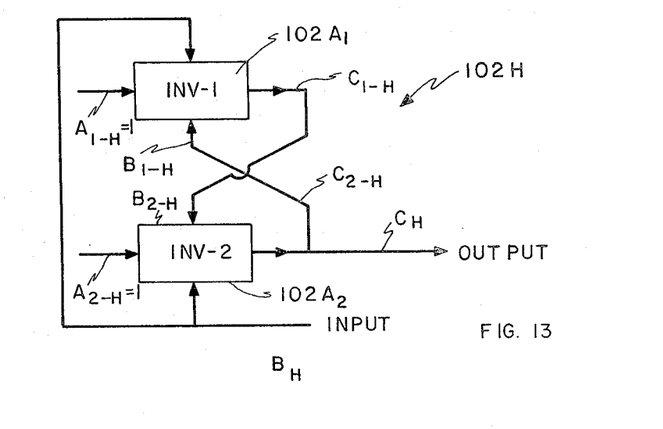
FIG. 13 shows diagrammatically an optical FLIP-FLOP.
Figure 14:
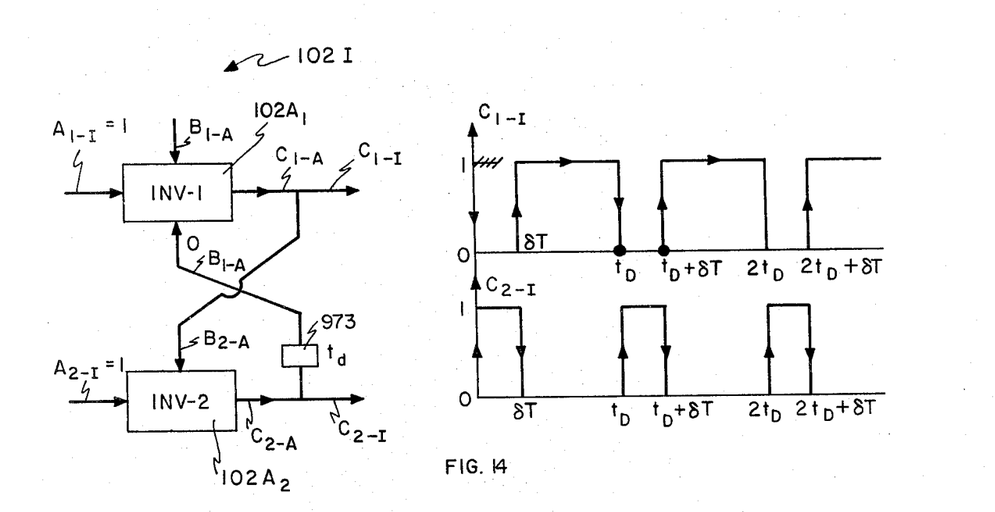
FIG. 14 shows diagrammatically an optical PULSE GENERATOR, optical CLOCK, or optical OSCILLATOR as well as a time-pulse diagram showing optical pulse outputs therefrom.

The FLIP-FLOP or BISTABLE MULTIVIBRATOR shown at 102H in FIG. 13 is the interconnected combination of two INVERTER gates 102A₁ and 102A₂. If the input shown at $B_H$ is Lo (i.e., =0) then the FLIP-FLOP rests in one of its two stable states, say with $C_{1-H}=0$ and $C_{2-H}=1$ (the other stable state being $C_{1-H}=1$ and $C_{2-H}=0$), so that the system output is $C_H=1$. Now if a Hi (=1) input pulse is applied at $B_H$, it causes the output of 102A₂ to become Lo and, therefore, the output of 102A₁ to become Hi. To complete this explanation, the pump signals to the INVERTERS 102A₁ and 102A₂ in FIG. 13 are respectively optical input signals $A_{1-H}$ and $A_{2-H}$, the optical control signals are $B_{1-H}$ and $B_{2-H}$ and the optical output signals are $C_{1-H}$ and $C_{2-H}$, the optical output signal $C_{2-H}$ being also the output $C_H$ of the FLIP-FLOP 102H and the outputs $C_{1-H}$ and $C_{2-H}$ being fed back respectively to the INVERTERS 102A₂ and 102A₁ to provide the control signals $B_{2-H}$ and $B_{1-H}$, respectively. A GENERATOR or CLOCK or OSCILLATOR is shown at 102I in FIG. 14. The system 102I again comprises two INVERTERS and again they are marked 102A₁ and 102A₂. An element 973 introduces a delay of duration $t_d$ between the output marked $C_{2-A}$ of the INVERTER 102A₂ and the input marked $B_{1-A}$ of the INVERTER 102A₁, i.e., $B_{1-A}(t)=C_{2-A}(t-t_d)$. The stable state has $C_{1-I}=1$ and $C_{2-I}=0$. If a 1-pulse, i.e., a Hi pulse, of duration $\delta T < t_d$ is applied to input $B_{1-A}$ the INVERTER 102A₁ at t=0, $C_{1-I}$ goes Lo for $\delta T$ and then recovers while $B_{2-A}$ goes to zero during $\delta T$ allowing $C_{2-I}$ to rise from Lo to Hi. After $\delta T$, $C_{1-I}$ returns to Hi and $C_{2-I}$ goes Lo until time $t_d$ when the delayed Hi output of $C_{2-A}$ reaches input $B_{1-A}$. This forces $C_{1-I}$ Lo from time $t_d$ to $t_d+\delta T$ during which time $C_{2-I}$ goes from Lo to Hi. At time $t_d+\delta T$, $C_{1-I}$ recovers from Lo to Hi, while $C_{2-I}$ goes from Hi to Lo. This pulse sequence is shown in FIG. 14. If $\delta T > t_d$, $C_{1-I}$ stays Lo and $C_{2-I}$ stays Hi.

Figure 15:
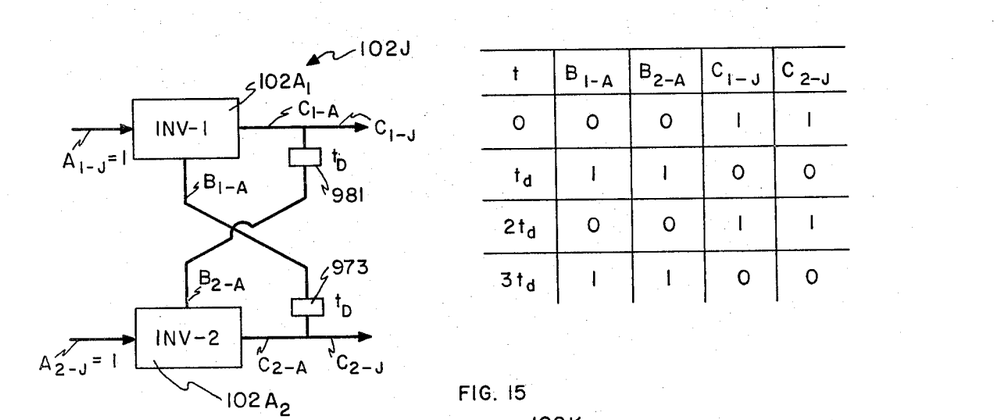
FIG. 15 is a diagrammatic representation of an optical ASTABLE MULTIVIBRATOR.

The device 102J in FIG. 15 is similar to the pulse generator 102I, as can be observed, but it has an additional time delay element 981 which places a time delay between the output of the INVERTER 102A₁ in FIG. 15 and the input control signal $B_{2-A}$ to the INVERTER 102A₂ thereof. Both time delay elements 973 and 981 have time delay $t_d$ as indicated in the truth table of FIG. 15. Unlike the pulses in the pulse diagram of FIG. 14, pulses in the optical output signal $C_{1-J}$ will have the same pulse length as those in the signal $C_{2-J}$; the output $C_{1-J}$ of the first optical INVERTER gate 102A₁ and the optical output $C_{2-J}$ of the second optical INVERTER gate are both of a Hi level when the optical input signals $B_{1-A}$ and $B_{2-A}$ in FIG. 15 are Lo, said Hi level persisting for a time $t_d$ characteristic of the optical time delay element 973 and 981 and the signals $C_{1-J}$ and $C_{2-J}$ being Lo from time $t_d$ to time $2t_d$, thereupon switching to a Hi level from time $2t_d$ to $3t_d$, and repeating with a time period $t_d$.

Figure 16:
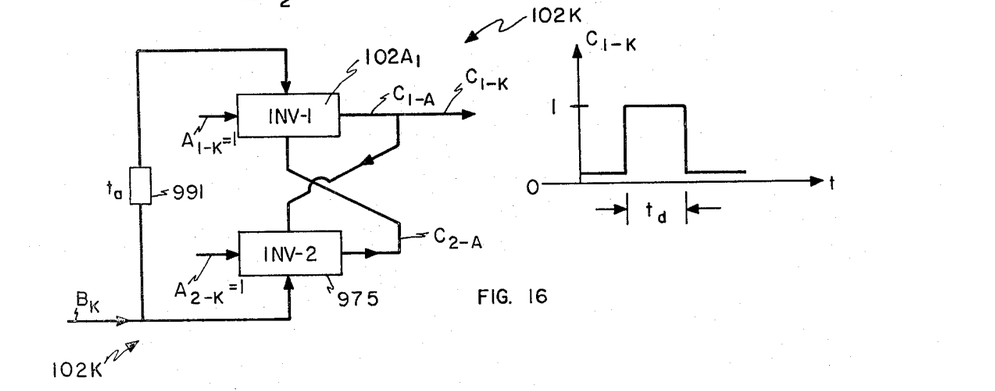
FIG. 16 shows diagrammatically an optical MONOSTABLE-MULTIVIBRATOR and a time-pulse diagram of its output.

A MONOSTABLE MULTIVIBRATOR 102K in FIG. 16 has an output optical signal $C_{1-K\ in\ the\ figure}$. The stable state of the device 102K is $C_{1-A}=0$, $C_{2-A}=1$. The device 102K, like the devices 102I and 102J, comprises first and second INVERTERS 102A₁ and 102A₂ whose optical outputs are again $C_{1-A}$ and $C_{2-A}$, respectively, the output $C_{1-A}$ being the system output $C_{1-K}$. An input trigger pulse $B_K$ changes $C_{2-A}$ to 0 and $C_{1-A}$ to 1. The same trigger pulse $B_K$ reaches the INVERTER 102A₁ after the delay time $t_d$ due to an element 991 and changes $C_{1-A}$ and $C_{2-A}$ back to 0 and 1, respectively. The system output $C_{1-K}$ is plotted in FIG. 16.

Figure 17:
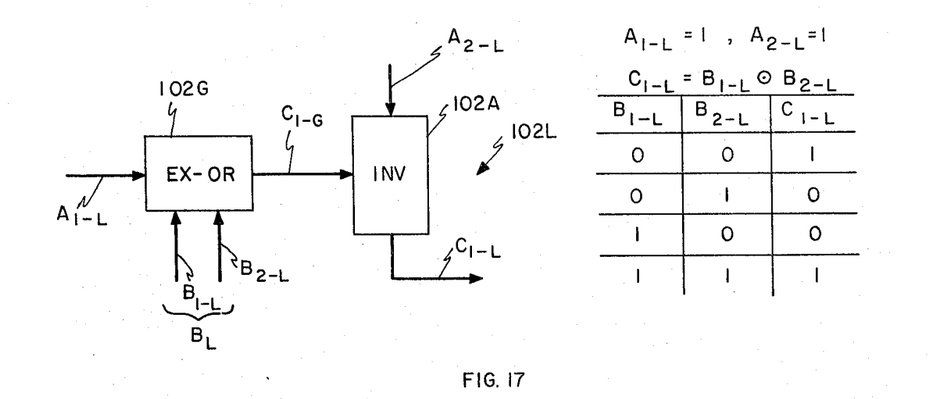
FIG. 17 shows diagrammatically an optical COINCIDENCE gate and corresponding truth table.

The COINCIDENCE gate shown at 102L in FIG. 17 is formed by the inter-combination of an EXCLUSIVE OR gate 102G and an INVERTER 102A and is seen to be the inverse of an EXCLUSIVE OR gate. The system output marked $C_{1-L}$ is $B_{1-L} \odot B_{2-L} = \overline{B_{1-L} \oplus B_{2-L}}$. The truth table for the device 102L is shown in FIG. 17.

Figure 18:
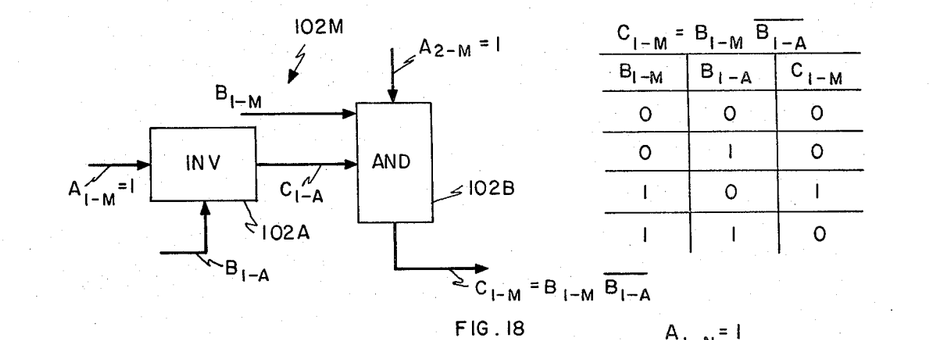
FIG. 18 shows diagrammatically an OPTICAL INHIBITOR and corresponding truth table.

The INHIBITOR marked 102M in FIG. 18 is formed by the inter-combination of an INVERTER 102A and an AND gate 102B. The input optical control signals to the device 102M are the signal marked $B_{1-M}$ and $B_{1-A}$. The optical output signal at $C_{1-M}$ is $B_{1-M}\overline{B_{1-A}}$. The corresponding truth table is shown.

Figure 19A:
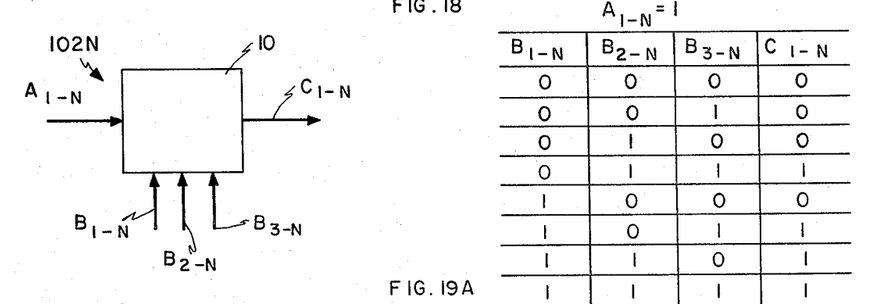
FIGS. 19A and 19B show diagrammatically an optical MAJORITY gate the corresponding truth table being shown in FIG. 19A.
Figure 19B:
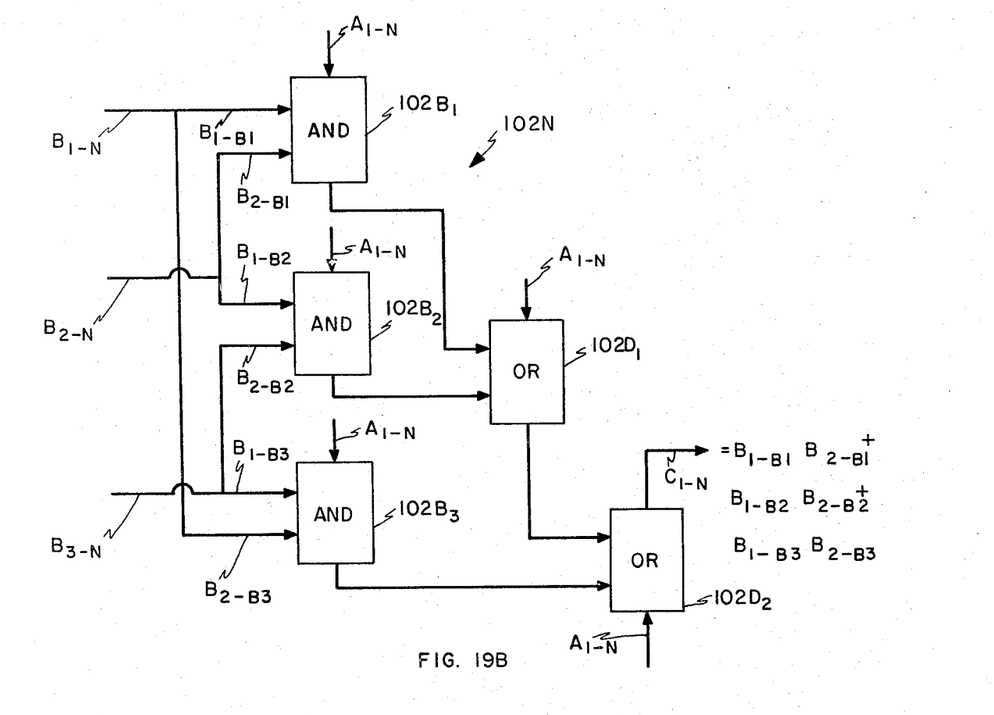

A three-input MAJORITY gate 102N is shown in FIGS. 19A and 19B. As shown in FIG. 19B, the MAJORITY gate is a cascaded combination of AND and OR gates and the particular combination shown in FIG. 19B is a three-input gate. The output at $C_{1-N}$ is in Boolean notation $C_{1-N} = B_{1-N}B_{2-N} + B_{2-N}B_{3-N} + B_{3-N}B_{1-N}$, i.e., it goes Hi if the majority (two or more) of the inputs are Hi. The pump signal to the various gates is shown as $A_{1-N}$ and the three input signals are marked $B_{1-N}$, $B_{2-N}$ and $B_{3-N}$. In the gate 102N, the initial or starting operating point is realized by moving the initial operating point to the point 197 in FIG. 4.

Figure 20:
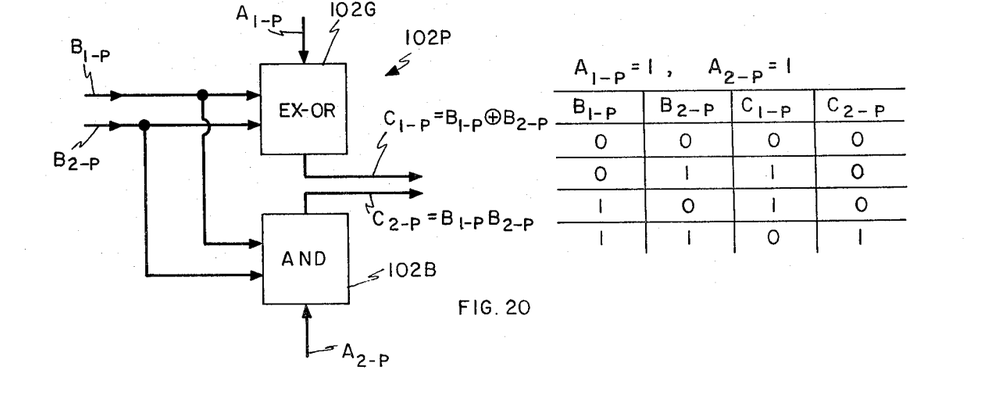
FIG. 20 shows diagrammatically an optical HALF-ADDER and corresponding truth table.

FIG. 20 shows a HALF ADDER 102P. It is the combination of an EXCLUSIVE OR gate 102G and an AND gate 102B. The optical control signal inputs to the device 102P are marked $B_{1-P}$ and $B_{2-P}$, the pump signals thereto are marked $A_{1-P}$ and $A_{2-P}$ and the optical outputs are marked $C_{1-P}$ and $C_{2-P}$. The truth table is shown in FIG. 20.

Figure 21:
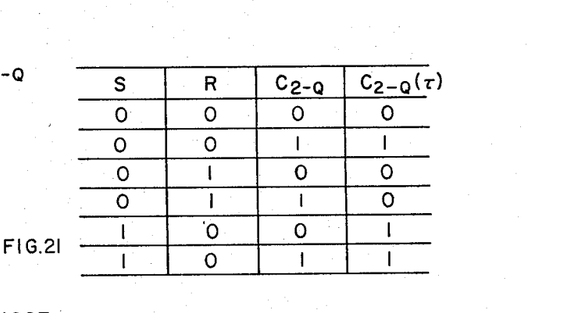
FIG. 21 shows diagrammatically an optical SR-FLIP-FLOP and corresponding truth table.
Figure 22:
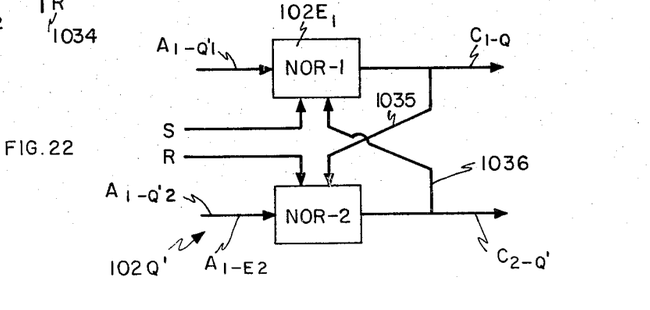
FIG. 22 shows diagrammatically an alternative combination of optical logic elements that form an optical SR-FLIP-FLOP.

In FIG. 21 an SR-FLIP-FLOP is shown at 102Q. It is the combination of two INVERTERS $102A_1$ and $102A_2$ pumped by signals $A_{1-Q1}$ and $A_{1-Q2}$ and each with an independent input control signal, i.e., S or R which correspond to the various control signals B in the other figures. The feedback loops 1035 and 1036 are evident in the figure. The system outputs are $C_{1-Q}$ and $C_{2-Q}$. $C_{2-Q}(\tau)$ is the value of $C_{2-Q}$ after the arrival of S or R. The truth table in FIG. 21 applies also to FIG. 22 with primes added. An implementation of an SR-FLIP-FLOP is shown at 102Q' in FIG. 22, using NOR gates $102E_1$ and $102E_2$.

In FIGS. 6 through 22 it has been shown how the optical transistor can be used to make the AND, OR, NAND, or NOR gates and other combinations. The structures depend critically on the operating point to which each optransistor is set or programmed. It has further been shown how to combine the basic logic elements into other configurations yielding a variety of devices. Other combinations can be made to yield these same end results as shown, for example, for the S-R FLIP-FLOP. Further combinations of the devices shown or devices derived from them can be made to yield an entire family of optical digital logic and signal processing devices. For example, S-R FLIP-FLOPS can be combined to make J-K FLIP-FLOPS. Schmitt triggers, ripple counters, shift registers, and analog-to-digital and digital-to-analog converters can be constructed. The optical logic elements and gates described above can be combined to form optical memory elements and an optical computer.

In general the optical transistors above discussed are considered to be solely optical but mention is made of the use of electrical and magnetic biasing. Electrical biasing is effected on the optical transistor 101B, 101E, 101F and 101H in FIGS. 2, 23, 24, and 26, respectively, and magnetic biasing is accomplished by the pole pieces of FIG. 25 as to the device 101G in which the optical medium marked 10G is magnetic. Inclusion of electric or magnetic biasing renders the optransistor a fourport device.

Figure 2:
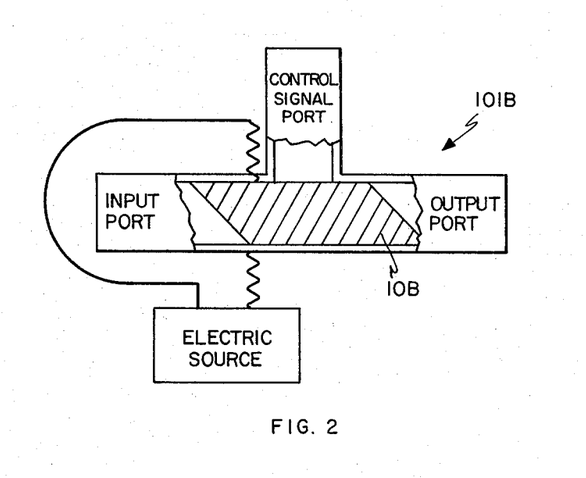
FIG. 2 is a similar view to that of FIG. 1 showing a modification of the optical transistor of FIG. 1.

The device 101B comprises an optical medium 10B which is a semiconductor material and, like the optical transistor 101A, comprises a waveguide structure. Electrical biasing is accomplished by an electric source to establish an operating point.

Figure 23:
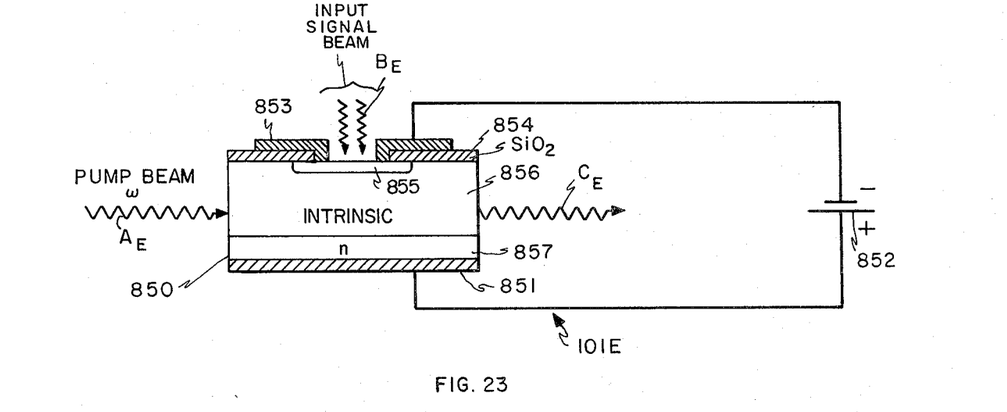
FIGS. 23-26 are schematic representations of modifications of the optical transistor of FIG. 1.

With reference to FIG. 23 an avalanche photodiode 850 is reverse biased using battery 852 and ohmic contacts 851 and 853. Photons from an input control signal $B_E$ create hole-electron pairs in a thin p-region 855. The holes are swept into an I region 856 when the avalanche producing many more hole-electron pairs. The thin p-layer shown at 855 should strongly absorb the signal $B_E$. However, the region 856 may form a heterojunction with the p-layer and be transparent to photons at the frequency of signal $B_E$. The frequency of the output beam marked $C_E$ may then be the same as input signal $B_E$. The optical signals $A_E$, $B_E$ and $C_E$ will generally enter and leave the hetro-structure device 850 by optical films, not shown. Eventually the holes are collected in the n region 857. The pump beam $A_E$ of frequency $\omega$ enters the I region 856 which is a nonlinear optical material capable of harmonic generation or, more generally, nonlinear mixing. The output beam $C_E$ is at $2\omega$ in the case of SHG and its amplitude depends on a phase matching condition that may involve the I region 856 only or may depend on the index in the p region 855 or the n region 857 or both. The enhanced changes in refractive index due to avalanche production of free carriers increases the sensitivity of the phase matching condition to the input control signal beam $B_E$. The I region 856 may, in fact, be a multilayer heterostructure for the purpose of controlling the confinement of the pump beam $A_E$ and/or the output beam $C_E$. Phase matching will also depend on the indices of the various layers and signals $A_E$ and $C_E$ may propagate in different layers.

Figure 24:
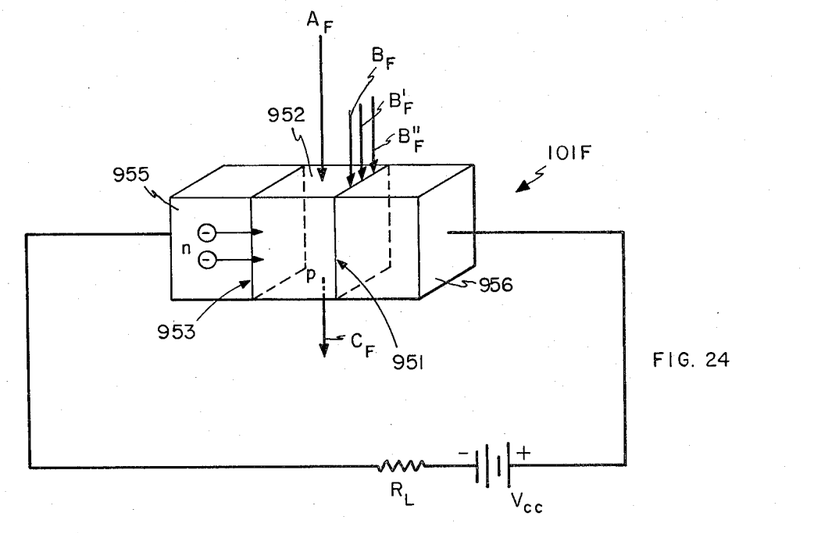
Figure 25:
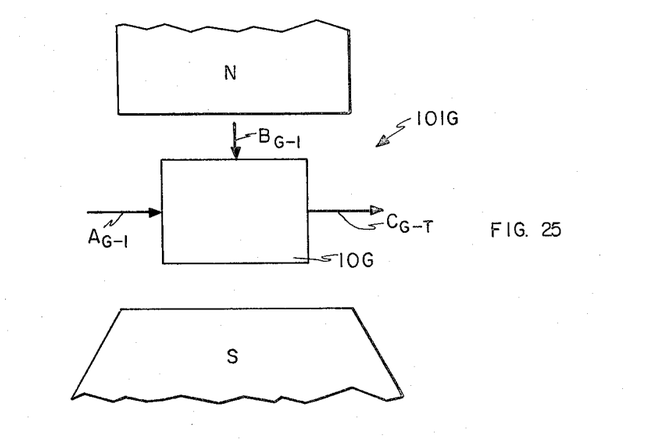
Figure 26:
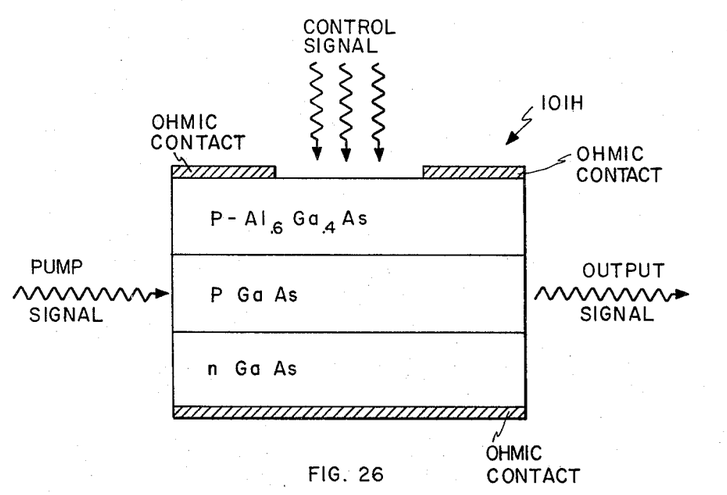
Figure 27:
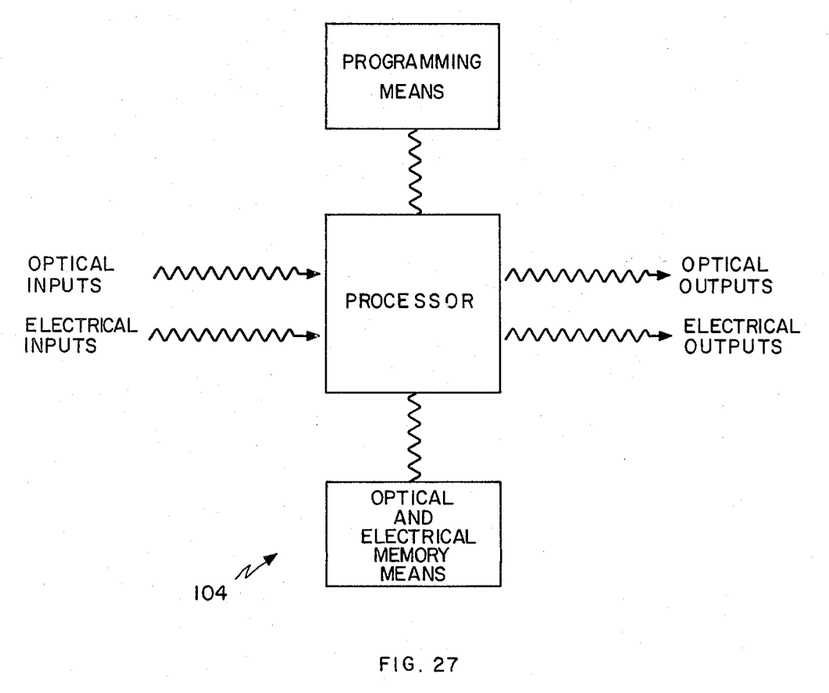
FIG. 27 shows, in block diagram form, an optical computer system.

With reference to FIG. 24 the structure marked 101F is a combination of phototransistor and optical transistor. Light from an input signal beam $B_F$ is introduced near the reversebiased, base-collector junction marked 951. Hole electron pairs generated by the signal $B_F$ separate in the high junction field and holes move across the base region shown at 952 and are swept across the forward biased emitter-base junction numbered 953. Because of a high injection efficiency at the emitter junction 953, a single hole entering the emitter region labeled 955 causes several electrons to be injected into the base region 952. Therefore, the number of carriers generated per photon of signal beam $B_F$ will be greater than one leading to an enhanced change in the index of refraction in the base region 952. A pump beam $A_F$ enters the base region 952 generally through an optical fiber or waveguide not shown in FIG. 24. The pump beam could be internally generated at the forward biased emitter-base junction 953 by radiative recombination familiar in LEDs and injection lasers. By using a nonlinear optical material for at least part of the base region 952, which could be a multilayer heterostructure, a nonlinear process will occur in the nonlinear optical medium resulting, for example, in SHG which exits in the base region 952 as output signal $C_F$, again through an optical fiber or waveguide not shown in FIG. 24. The signal beam $B_F$ need not be a single laser beam but can be parallel beams as indicated by the beams marked $B_F$, $B'_F$ and $B'_F$. A voltage source $V_{cc}$ powers the device 101F being connected to the emitter 955 and collector 956.

It has been pointed out above that the great sensitivity of optical properties to the index of refraction can be the basis for gain in the optical transistor. There are several alternative means of changing the refractive index in addition to the generation of free carriers which, as discussed, alters the plasma frequency and consequently the dielectric constant in certain materials. There is a class of magneto-optical effects wherein an applied magnetic field affects the optical properties of a medium including the refractive index. Among these effects are magneto-reflection, magneto-absorption, Faraday rotation, the Voigt effect, and the effect of a magnetic field on impurity states, localized carriers, excitons and on domains and domain walls. There is also a class of effects of an applied electric field upon optical properties and, in particular, upon the index of refraction. A member of this class is the electro-optic effect wherein the dielectric tensor and, hence, the refractive index changes upon the application of an electric field. A very efficient light modulator has been made by Reinhart et al. [F. K. Reinhart and B. I. Miller, App. Phys. Lett. 20, 36 (1972)] in GaAs-$Al_x Ga_{1-x}$As double heterostructures (DH). They found that a reverse biased GaAs-$Al_x Ga_{1-x}$As DH formed a naturally occurring optical dielectric waveguide. They further found that light propagating in this guide was strongly affected by the electro-optic effect and that a very strong phase, polarization, or intensity modulator of unparalleled efficiency could be realized. The presence of the junction field was found to produce birefringence in the depletion layer region and a small applied reverse bias produced a large phase change for light travelling in the optical dielectric waveguide formed in the high field region. In a more recent work [J. P. Van der Ziel and M. Llegems, Appl. Phys. Lett. 28, 437 (1976)] optical SHG has been achieved in periodic multilayer GaAs-$Al_{0.3}Ga_{0.7}$As heterostructures where the pump signal (the signal A herein) of frequency $\omega$ and the output signal (the signal C herein) at $2\omega$ travel in opposite directions. The work of Reinhart et al demonstrates that the refractive index in these heterostructures can be significantly varied by changing the internal electric field. A very effective electro-optic modulator would be realized by altering the phase matching condition for SHG or other optical mixing process by electrically varying the internal fields in a thin film waveguide, heterojunction, p-i-n structure and the like. This would provide a means of encoding an electrical signal into a correspondingly coded optical signal. Thus an optical transistor adapted to receive an electric or magnetic bias signal for the purpose of affecting the operating point could be used alone or in combination with input control signals to the base port to produce output signals at the emitter port to convert electrical signals into optical signals. Furthermore, an optical transistor can be achieved by having an optical control input signal beam (the signal B herein) at the base port impinging upon the heterostructure in order to produce hole-electron pairs which in turn alter the internal field felt by the optical dielectric waveguide wherein SHG or optical mixing takes place. Photo produced carriers by input optical control signal B would act to effectively alter the reverse bias across the heterostructure. This would, by virtue of the electro-optic effect, alter the refractive index which, in turn, would change the effective operating point for SHG or other optical mixing process and thereby produce optical transistor action.

As will be discussed more fully below, the number of photons present in a typical optical pulse in an optical computer or communications system or optical data processor should significantly change the operating point in either the plasma frequency mechanism or in the electro-optic effect mechanism for varying the refractive index.

A light emitting diode (LED) operating at 1 mW output power commonly couples 100 $\mu$W into an optical fiber. This is, of course, incoherent radiation and of relatively broad bandwidth compared to a laser output. If the fiber carried $10^8$ pulses per second, each pulse would contain $10^{-12}$ joules of energy. The number of photons contained in each pulse would be $10^{-12}/\hbar\omega$ where $\omega$ is the center frequency of the LED. At a frequency corresponding to 1 ev each pulse would contain $6.25 \times 10^6$ photons. It is highly desirable that such an optical pulse entering the base port of an optical transistor have sufficient influence upon the transistor so that a change in operating point can be effected. If each incident photon contained within a pulse of the optical control signal produced a hole-electron pair, the generation rate would be of the order of $10^{15}$ sec$^{-1}$ per unit area. If the area illuminated by the base port were $10^{-4}$ cm$^2$ and the lifetime $10^{-8}$ seconds, the incident pulse would generate an open circuit photovoltage of the order of 0.6 volts. This voltage applied over the typical dimension of the depletion layer of a p-n junction would result in a change in electric field E of approximately 10 kv/cm. This in turn will produce a change in index of refraction of the order of $n^3 r_{41} E$, where n is a measure of the index in the absence of E. Using the appropriate constants for GaP leads to a refractive index change of the order of $0.4 \times 10^{-4}$ which is sufficient to change the operating point from near 201 in FIG. 4 to near point 203 in FIG. 4. Using avalanche multiplication techniques, an even greater response can be obtained from the photons contained in a single pulse. The electro-optic effect can be further used to preset or program the operating point of an optical transistor by applying the appropriate electric or magnetic bias to the optical medium thereof.

A few matters of a general nature are included in this paragraph. In FIG. 1, the waveguide or fiberguide 8 is shown oriented orthogonal to the waveguides or fiberguides 7 and 9, but other relative orientations may be used, including a configuration in which the collector and base ports are physically identical; it is further possible that all three ports be physically identical. In either situation, means is required to distinguish among the separate signals. The embodiments in FIGS. 2, 24, 25, 26 and 27 show three optical ports and electromagnetic bias ports of FIGS. 2, 24, 25 and 27 showing electric ports and FIG. 26 a magnetic bias port; these latter figures constitute a class of four-port devices. It will be appreciated that the logic elements above described and modifications thereof can be assembled in an interconnected network to form an optical computer as shown at 104 in FIG. 27 wherein the signals generated can be "1s" and "0s" as a function of output signal amplitude polarization or of output signal frequency, or all, and furthermore, gradations in the signal can be provided; hence several advantages over existing computer systems are available.

An optical threshold device as shown at 14 in FIG. 3 is obtained if an initial operating point is established at 204. The device receives a pump signal which produces an output signal only when the operating point is moved to the region between 201 and 199. An input optical control signal moves the operating point by changing the phase-matching condition. If the intensity, or level, of the input control signal is such that the operating point is moved to the region between 204 and 201, the output signal remains at a Lo level. If the level of the input control signal is such that the operating point is moved to the region between 201 and 199, the output signal switches to a Hi level. Finally, if the input control signal is such that the operating point moves beyond 199, the output signal returns to Lo level. Thus, 201 and 199 serve the purpose of lower and upper threshold levels, respectively. These threshold levels can be adjusted by selecting a different (other than 204) initial operating point.

Further modifications of the invention herein described will occur to persons skilled in the art, and all such modifications are deemed to be within the spirit and scope of the invention as defined by the appended claims.

What is claimed is:

1. An optical transistor comprising:
  (a) a non-linear optical medium having a variable refractive index;
  (b) means for introducing an optical pump signal along a defined axis into the medium;
  (c) an optical collector port connected to the medium to receive as an input the optical pump signal;
  (d) means for introducing at least one optical control signal into the medium;
  (e) an optical base port connected to the medium to receive as an input said optical control signal; and
  (f) an optical emitter port connected to the medium to emit from the medium an optical output signal of different frequency than the pump signal, the optical medium being characterized by its ability to generate a harmonic of the pump signal as an internal signal, the output signal being derived from the internal harmonic signal, and the control signal acting upon the medium to effect a change in the refractive index of at least a part of the medium and thereby modifying a phase relationship between the pump signal and the internal harmonic signal to vary the output signal.

2. The transistor of claim 1 wherein the transistor further comprises an orientation means for adjusting the range of operations by changing the orientation, of the medium relative to the axis of the optical pump signal.

3. The transistor of claim 1 wherein the medium is responsive to a electric bias and the transistor further comprises an electric bias means for adjusting the range of operations by applying a variable voltage across the medium.

4. The transistor of claim 1 wherein the medium is responsive to a magnetic bias and the transistor further comprises a magnetic field means for adjusting the range of operations by applying a magnetic field across the medium.

5. The transistor of claim 1 wherein the medium is tellurium.

6. The transistor of claim 1 wherein the medium is lithium niobate.

7. The transistor of claim 1 wherein the medium is gallium arsenide.

8. The transistor of claim 1 where in the medium contains a heterostructure.

9. The transistor of claim 1 wherein the medium contains a p-n junction.

10. The transistor of claim 1 wherein the medium contains a p-i-n structure.

11. The transistor of claim 1 wherein the medium is a birefringent crystal.

12. An optical logic element performing the function of an inverter comprising the transistor of claim 1 and a means to adjust the range of operation so that conversion of the pump signal to the harmonic signal is substantially maximized in the absence of the control signal and conversion efficiency is reduced upon application of the control signal.

13. An optical logic element performing the function of an "AND" gate comprising the transistor of claim 1 and a means to adjust the range of operation so that conversion of the pump signal to the harmonic signal is substantially maximized only upon the conincidence of two separate control signals.

14. An optical logic element performing the function of an "OR" gate comprising the transistor of claim 1 and a means to adjust the range of operation so that conversion of the pump signal to the harmonic signal is substantially maximized upon the incidence of either a first control signal or a second control signal but not upon coincidence of the first and second control signals.

15. An optical logic element performing the function of a "NOR" gate comprising the transistor of claim 1 and a means to adjust the range of operation so that concersion of the pump signal to the harmonic signal is substantially maximized in the absence of any control signal and conversion efficiency is reduced upon the incidence of a first control signal or a second control signal or the coincidence of both the first and second signal.

16. An optical logic element performing the function of a "NAND" gate comprising the transistor of claim 1 and a means to adjust the range of operation so that conversion of the pump signal to the harmonic signal is substantially maximized in the absence of a control signal and remains maximized upon the incidence of a first or second control signal, but is substantially reduced upon the coincidence of the first and second control signals.

* * * * *